Feb. 23, 1926.
A. SUTHERLAND
1,574,265
TEAT CUP
Filed March 7, 1925
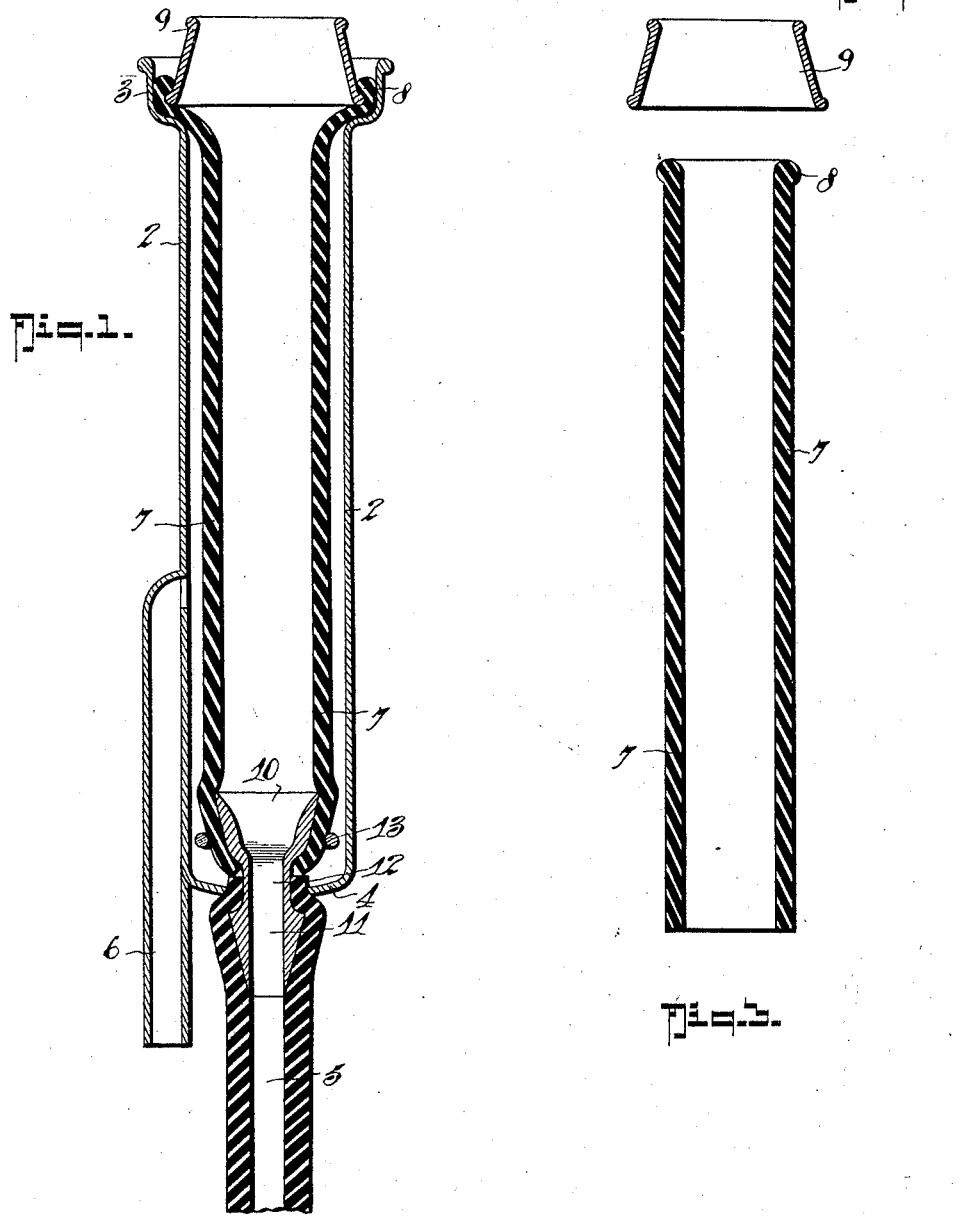
INVENTOR
Angus Sutherland.
BY
Albert E. Dietrich
ATTORNEY Patented Feb. 23, 1926.

1,574,265

UNITED STATES PATENT OFFICE.

ANGUS SUTHERLAND, OF VANCOUVER, BRITISH COLUMBIA, CANADA.

TEAT CUP.

Application filed March 7, 1925. Serial No. 13,759.

*To all whom it may concern:*

Be it known that I, ANGUS SUTHERLAND, a subject of the King of Great Britian, residing at Vancouver, in the Province of British Columbia, Canada, have invented certain new and useful Improvements in Teat Cups, of which the following is a specification.

This invention relates to a teat cup for a milking machine of that class wherein the milk is withdrawn from the teat by a vacuum maintained in the milk delivery pipe, and a pulsating air pressure in the casing of this teat cup.

The improvements are directed to the means for connecting the rubber inflation tube of the teat cup to the outer metal casing of the same and to the milk delivery tube in a manner that will enable an effective air-tight joint at these connections to be obtained in a simple and direct manner, and without undue tension being imposed on the inflation tube.

The several parts of the device are simple to manufacture and are free from any narrow grooves or ledges that cannot readily be cleansed.

These several advantages are attained in the manner set forth in the following specification, reference being made to the drawings by which it is accompanied, in which:

Fig. 1 is a vertical longitudinal section of the teat cup complete, and

Figs. 2 and 3 are detached details of the inflation tube and its upper mouth ring respectively.

In these drawings 2 represents the casing of the teat cup, the upper end of which has a shouldered enlargement 3 and the lower end 4 is abruptly contracted to an aperture adapted to receive the milk delivery tube 5 of rubber. To adjacent this lower end 4 the pipe from the inflator is connected at 6.

The rubber inflation tube 7, which is inserted in the casing 2, is parallel throughout its length and the upper end has an outwardly projecting bead 8. This beaded upper end of the inflation tube is expanded outward to fit the shouldered enlargement 3 of the casing by insertion within it of the larger end of a conical bushing 9.

The inner surface of this bushing is perfectly smooth and the edges are merely beaded over outward to provide a smooth contact in one case for the rubber inflation tube and at the other end an air-tight seal on the teat of the cow being milked.

The length of the inflation tube 7 is such that its lower end is well within the lower end 4 of the casing 2 and to it the milk delivery tube 5 is connected by a tubular member 10, 11, 12. This connecting member comprises a conical portion 10 adapted to fit within the inflation tube 7 and be retained thereon by a metal ring 13 a reduced neck 12, and a smaller conical portion 11 adapted to fit the milk delivery tube 5.

The end 10 of this member is connected to the inflation tube 7 before its introduction into the casing 2 and its end 11 projects through the aperture in the end 4, so that the milk delivery tube 5 can be pressed over the conical end 11 and its enlargement being without the end 4, that enlargement is drawn tightly into the aperture and makes an air-tight closure.

It will be seen that the several parts of the teat cup can be removed and replaced without any undue tension or flexure being imposed on the rubber inflation tube; and not only so but the connection is one which can be readily adapted to make an air-tight connection even if the length of the inflation tube has been increased in use, that is, the connection can be lengthwise adjusted at 10 to adapt it to slight variations of length and to ensure an air-tight connection at 4.

Furthermore, the several parts are simple to construct and are free from any inequalities which might interfere with the free flow of the milk or prevent the parts being effectively cleaned.

Having now particularly described my invention, I hereby declare that what I claim as new and desire to be protected in by Letters Patent, is:

1. A teat cup, comprising the combination with an outer casing having a shouldered enlargement at the upper end and at the lower end a reduced concentric aperture with means intermediate the ends for connecting an inflator to the space within the casing, an inflation tube the length of which is less than the casing, a mouth ring comprising a frustrum of a smooth surfaced hollow cone the larger end of which is adapted for insertion within the upper end of the inflation tube to expand the same to fit the shouldered enlargement of the casing and retain it therein, a tubular connection between the lower end of the inflation tube within the casing and the milk delivery tube, said connection expanding the milk delivery tube without the casing that the enlargement of it will seal the aperture through which it passes into the casing.

2. A teat cup, comprising the combination with an outer casing having a shouldered enlargement at the upper end and reduced at the lower end to a concentric aperture, said casing having intermediate its ends a means for connecting an inflator to the space within the casing, an inflation tube extending from the shouldered enlargement to adjacent the lower end of the casing, a mouth ring comprising the frustrum of a hollow cone the larger end of which ring is adapted for insertion within the upper end of the inflation tube to retain the same within the shouldered enlargement of the casing, a tubular connection between the lower end of the inflation tube within the casing and the milk delivery tube without the same, said connection having at one end a conical enlargement adapted to pass within the inflation tube and at the other end a conical enlargement adapted to pass within the milk delivery tube, and a ring to retain the inflation tube on the enlargement.

In testimony whereof I affix my signature.

ANGUS SUTHERLAND.